United States Patent [19]  [11] 3,885,980
Noone  [45] May 27, 1975

[54] FIRE RESISTANT COMPOSITION
[75] Inventor: Michael J. Noone, Wayne, Pa.
[73] Assignee: General Electric Company, Fairfield, Conn.
[22] Filed: Apr. 12, 1973
[21] Appl. No.: 350,538

[52] U.S. Cl. .............................. 106/109; 106/110
[51] Int. Cl. .......................................... C04b 11/00
[58] Field of Search ................... 106/109, 110, 116

[56] References Cited
UNITED STATES PATENTS
1,989,712  2/1935  Schoch ............................. 106/110
2,785,988  3/1957  Lipkind et al. .................... 106/109
3,183,107  5/1965  Alford et al. ..................... 106/110

FOREIGN PATENTS OR APPLICATIONS
1,457  6/1905  United Kingdom ................ 106/110
160,092  2/1964  U.S.S.R. ........................... 106/109

OTHER PUBLICATIONS
Proc. Roy. Soc. Lond., "Glass Fibre Reinforced Cement and Gypsum Products," pp. 69–68 (1970) No. 1536.

Primary Examiner—Delbert E. Gantz
Assistant Examiner—John P. Sheehan
Attorney, Agent, or Firm—Allen E. Amgott; Raymond H. Quist

[57] ABSTRACT

A container protective against high temperature of restricted duration is formed of a mixture of plaster of paris containing incombustible reinforcing filler, such as glass fibres, and/or insulating filler, such as glass spheres; and a particulate inorganic hydrate, such as magnesium sulphate, which may have a water-insoluble coating. It may also contain an infrared opacifier, such as chromium oxide. The container cover is preferably stepped, to eliminate a direct radiation path between the cover and the container; and the stepped seat or the stepped edge of the cover may be covered with a fusible incombustible material, such as a glass cloth of suitable melting point, to seal the joint between cover and container in the existence of high temperature. The wall structure may be graded, having higher melting filler and reinforcement at the exposed face, and lower melting filler at the interior portions.

2 Claims, 1 Drawing Figure

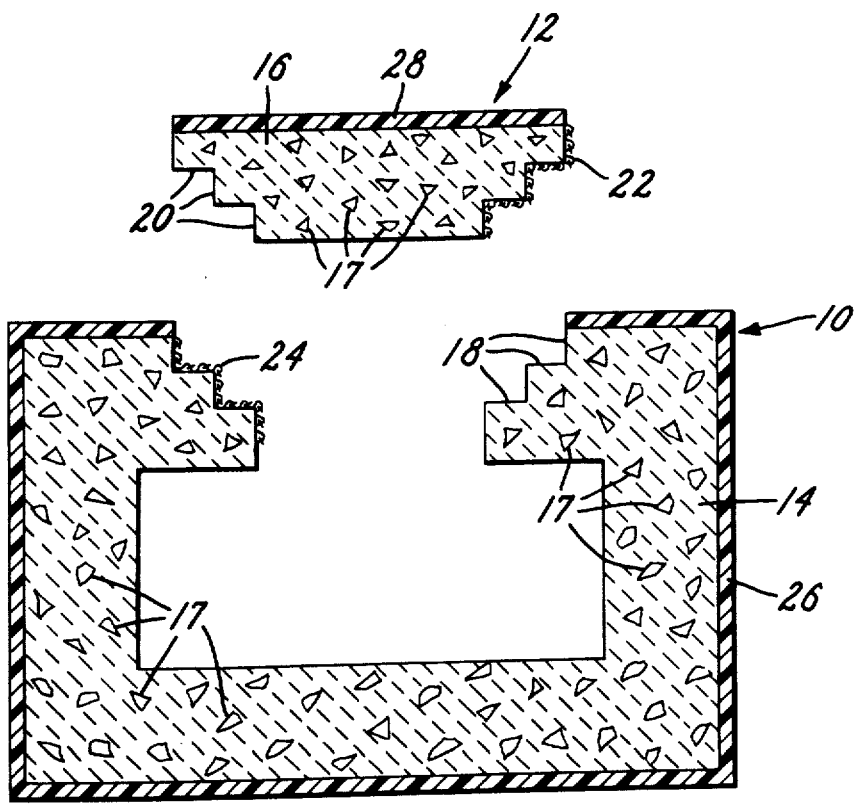

FIRE RESISTANT COMPOSITION

CROSS-REFERENCE TO RELATED APPLICATIONS

CLOSURE FOR FIRE RESISTANT STRUCTURE, Howard W. Semon, Ser. No. 350,537 filed Apr. 12, 1973 and assigned to the assignee of this application.

ENCAPSULATED SALT ADDITIVES, Louis R. McCreight, Ser. No. 350,536 filed Apr. 12, 1973 and assigned to the assignee of this application.

BACKGROUND OF THE INVENTION

1. Field of the Invention

This invention pertains to high temperature resistant structures, particularly as containers.

2. Description of the Prior Art

The general field is very old and extremely broad. Burial in earth and enclosure in thick-walled incombustible structures are presumably prehistoric, as is wetting down material in danger of exposure to high temperature. Modern examples of protective structures include fire-resistant safes, which are usually metal enclosures lined with inorganic thermal insulating materials, such as magnesia blocks. More recently ablative coatings to protect space vehicles during re-entry have assumed many forms. An objective of these has been combined light weight and low cost. Plaster of paris has, in general, not been accepted as suitable for such service, since it loses much of its mechanical integrity when it is heated to a temperature at which it is wholly or partially dehydrated.

In general, every embodiment of the prior art is an ad hoc design for particular known or assumed temperature and duration.

SUMMARY OF THE INVENTION

Plaster of paris is inexpensive and readily produced in any desired form by a variety of techniques. In the present disclosure it is reinforced by the addition of glass fibers, and its insulation ability improved by addition of hollow glass spheres, and with incombustible fibers (which may be formed into cloth) at one or both surfaces. It is desired to provide low thermal conductivity through the structure and to provide maximal heat absorption in the structure in order that a given mass of material will provide a reduced temperature within the structure for the longest possible time. To this end, insulating fillers in the form of hollow glass spheres or expanded vermiculite material are added and noncombustible hydrates are included in the mixture. Magnesium sulphate hydrate ($M_gSO_4 \cdot 7H_2O$) is preferred, since it is slightly more than one-half water by weight and it decomposes at low temperatures to leave a residue of magnesium sulphate and then further decomposes at high temperatures to form magnesium oxide, which is itself a refractory and tends to preserve the structural form of the plaster mixture in which it is embedded. In order to reduce thermal radiation through the structure an infrared opacifier, such as chromic oxide, may be included. In order to keep the magnesium sulphate from dissolving in the water used in preparing the plaster mixture, it may be coated with a thin layer of water-insoluble material, which may be a wax or an organic resin, since the total mass of combustible material thus added will be too small to constitute an appreciable impairment of the incombustibility of the structure; and the elimination of a possible limitation in the proportion of magnesium sulphate (or other soluble inorganic hydrate) which may be added more than compensates for the presence of organic material.

Since the density of gypsum is less than that even of metallic aluminum, and less than one-third that of steel, the resulting structure may be lighter than any structure embodying substantial proportions of common metals suitable for the envisaged service.

The structure described, is, of course, not intended for continuous exposure to high temperatures. It is intended to protect temperature-vulnerable material against catastrophe such as intense fire lasting of the order of one hour. This period corresponds to the time rating of commercial fireproof safes. It is, of course, possible to extend the survival time indefinitely by increasing the thickness of protective material used; the time cited is an example of a period which has been found practically adapted to common situations.

A particular desirable feature of containers according to the present disclosure consists in the use of a stepped joint between the wall and the lid or door of the container in which one or both faces of the joint are covered with an incombustible material (such as glass cloth) having a melting point adequately above normal expected temperatures of normal use, but low enough so that in the catastrophic event it will melt and seal the opening tightly closed, providing a seal against entry of hot gases. Since the structure can be opened by conventional means, such as cold chiseling, after the emergency, the contents may be recovered without the inconvenience and possible danger involved in cutting metal, which may require the use of a cutting torch. This may also retain the cover in place if outside fastenings are destroyed.

BRIEF DESCRIPTION OF THE DRAWING:

The FIGURE represents in section a container according to the present disclosure.

DESCRIPTION OF THE PREFERRED EMBODIMENT:

Since the nature of the formulations is an essential part of the invention, first discussed is choice of materials, and the mode of testing the various formulations.

Magnesium sulphate hydrate $M_gSO_4 \cdot 7H_2O$, molecular weight roughly 246.3 of which 126, or about 51 percent, is water, is ancient, commercially abundant, nontoxic in any reasonable ingested quantity; and it leaves as a residue after calcination an oxide which is stable chemically and physically and a notably useful refractory. The oxides of sulphur which are produced during calcination are in the same general chemical family with the sulphate radical which is present in the hydrated plaster of paris $CaSO_4 \cdot 2H_2O$, or gypsum (waiving any objection of the mineralogist that gypsum must be restricted to the naturally occurring mineral), and will not attack or destroy it. While magnesium oxide may be added to certain ceramic formulations as an additional component in which it does promote formation of a lower melting compound, it is not a notorious low-melting flux as e.g. the oxygen compounds of boron (including its compounds with oxides of the more strongly alkaline metals in the periodic table). Borax, $Na_2B_4O_7 \cdot 10 H_2O$, with a water content of over 47 percent and commercial availability and price compatible with tonnage use in the ceramics field, upon trial proved to be deleterious in its effect upon the setting of plaster of Paris, and disastrously fluxing at high temperatures. Hydrated lithium metaborate, $LiBO_2.8H_2O$, with a water content of almost 75 percent appears not to be a regular commercial item, and so was not tested, but would be expected to have the disadvantages of borax and a higher cost, not compensated by its higher water content. Ammonium alum, $NH_4AL(SO_4)_2.12H_2O$ with a water content of almost 48 percent appeared a priori very attractive; but the mechanical properties of bodies incorporating it were unsatisfactory.

Aggregates used depended upon the required maximum temperature against which protection was desired. Hollow fused silica glass spheres sufficiently small to mix readily into a plaster of paris formulation without separating out or impairing fluidity or surface smoothness excessively have been used as aggregates in all formulations; glass spheres of low melting point, exfoliated vermiculite, and diatomaceous earth have also been employed for the lower temperatures. So long as they do not react chemically, or melt, at the desired temperatures, aggregates appear to be effective by the insulation they afford — that is, to their contribution to thermal resistance. Since they are of low density, the aggregates contribute to reduce the density of the total body.

U.S. Pat. No. 3,183,107, of Alford and Veatch, issued May 11, 1965, gives several examples of plaster formulations with glass sphere aggregates. "Plastering Skill and Practice" by van den Branden and Knowles, American Technical Society, Chicago, U.S.A., copyright 1953, discusses plastering generally, and in its chapter IV, beginning at page 78, describes the methods of formulating plaster and aggregate mixes.

The preparation of samples consisted of casting the sample formulation into a 7 by 7 inch rectangle, usually against a reinforcement or support of glass, asbestos, or fused silica cloth, and allowing it to set or cure. This was permitted to continue until the excess water had passed off enough to permit direct exposure of the sample face to the test temperature without cracking or spalling from generation of steam. The sample was placed against a 5 by 5 inch opening in a muffle furnace, with a drape of ceramic cloth to reduce heat flow to the edge of the sample panel. A thermojunction was placed at the back or cold face of the sample, with a bit of organic cement to provide it with good thermal contact to the sample; and refractory (not insulating) brick was placed behind the sample to hold it in place. A test was begun by placing the sample against a previously heated muffle so that the hot face was exposed immediately to radiation corresponding to the test temperature. Recordings of the temperature at the back side of the sample were made, always with the same qualitative result, but with quantitative differences. The temperature of the back face first rose roughly linearly with time, the rate depending upon the thermal resistance of the initial compound, being less for larger proportions of aggregates. Then, when the dehydration temperature of the salt inclusions were reached, the temperature remained constant while the dehydration proceeded, after which it rose again. The total time from placing of the sample against the muffle opening until the back face temperature reached 200 degrees centigrade was taken as the survival time of the sample. A satisfactory sample must retain some physical integrity at the end of the survival time; samples whose hot face had fluxed or otherwise disintegrated were considered unsatisfactory regardless of nominal measured survival time. The desired thickness of samples was 28 mm., but the casting process employed did not permit accurate control of thickness, so that strictly comparable results were not obtained for the various formulations. However, a distinct trend to longer survival times for higher hydrated salt contents was established, with relative insensitivity to proportion of aggregate.

The following tabulation of results is for tests at 1400°C.; the salt was magnesium sulphate hydrate, the aggregate was fused silica hollow spheres ("microballoons"), and the survival time is given in minutes. Thickness is in mm. including face sheets of glass cloth asbestos and epoxy.

| % Salt | Ratio Aggregate/Plaster | Time | Thickness |
| --- | --- | --- | --- |
| 14 | 1.0 | 24 | 34 |
| 37 | 0.7 | 28 | 34 |
| 40 | 1.0 | 20 | 30 |
| 54 | 0.65 | 28 | 30 |
| 54 | 1.09 | 30 | 28 |
| 56 | 1.0 | 30 | 28 |
| 58 | 0.91 | 33 | 30 |
| 58 | 1.00 | 33 | 28 |
| 62 | 0.81 | 36 | 29 |
| 63 | 2.47 | 39 | 34 |

While variations in thickness prevented strict correlation, and the difficulty of determining accurately when the back face reached the set temperature would necessarily cause random deviations in the time determination, there is a clear trend of increased survival time up to the 63 percent salt content.

Similar tests at 850°C. were made. The letters D and V indicate that diatomite and exfoliated vermiculite were used instead of the more expensive hollow silica spheres.

| % Salt | | Ratio Aggregate/Plaster | Time | Thickness |
| --- | --- | --- | --- | --- |
| 30 | D,V | 1.33 | 33 | 28 |
| 31 | D,V | 1.09 | 30 | 27 |
| 31 | | 1.23 | 23 | 23 |
| 34 | D,V | 1.0 | 49 | 33 |
| 47 | V | 0.61 | 32 | 26 |
| 50 | D,V | 1.0 | 42 | 28 |
| 51 | | 0.63 | 45 | 27 |
| 54 | | 0.71 | 36 | 26 |
| 55 | | 0.80 | 50 | 30 |
| 58 | | 1.10 | 52 | 30 |
| 60 | | 1.0 | 48 | 28 |

Again, a trend to better performance at salt concentrations up to 60 percent is discernible, although the thickness variations tend to make the results somewhat obscurant of the trend in particular instances.

Similarly, at 630°C. compatible results were obtained.

| % Salt | | Ratio Aggregate/Plaster | Time | Thickness |
| --- | --- | --- | --- | --- |
| 0 | D,V | 1.0 | 30 | 18 |
| 37 | D,V | 0.51 | 45 | 20 |
| 42 | D,V | 1.0 | 43 | 21 |
| 44 | D,V | 0.51 | 48 | 20 |

-Continued

| % Salt | Ratio Aggregate/Plaster | Time | Thickness |
| --- | --- | --- | --- |
| 59 | 1.73 | 95 | 34 |
| 63 | 1.31 | 55 | 24 |

The smaller number of samples at the lower temperature renders the trend to improved results with increasing proportions of salt less obvious, but still detectable.

While there is no very clear benefit in terms of survival time from the use of aggregates, the addition of aggregates is beneficial in reducing the density of the formulation, and in providing a proportion of solids which will not decompose at the temperature of the hot face, so that the physical integrity of the sample after it has been used for its survival time is better preserved.

Samples of the following compositions were prepared and tested at 1400°C. Both failed, by melting, in about 10 minutes:

| Ratio Aggregate/Plaster | % Borax |
| --- | --- |
| 1.33 | 30 |
| 0.875 | 25 |

A sample of Aggregate/Plaster 1.33 and 30 percent ammonium aluminum sulphate hydrate was also prepared and tested at 1400°C. Its survival time was only about 75 percent that of a similar formulation with magnesium sulphate hydrate.

Reference is now made to the drawing. Reference 10 is a section of a container and 12 a matching plug, cover, or closure. The major part 14 of the body of the container 10 and the major part 16 of the cover 12 is of the formulation described — that is, of plaster of paris with inclusions 17 of inorganic hydrate, preferably magnesium sulphate hydrate. The representation of hydrate inclusions 17 is purely symbolic, since they will ordinarily be too finely particulate and far too numerous to be readily represented with accuracy. The aperture of the container 10 is provided with steps 18, which mate with steps 20 of the cover 12. By way of emphasizing the alternate possibility, low-melting glass cloth 22 is represented on the right side of cover 12 applied to the steps 20, and similar glass cloth 24 is represented on the left side of the aperture of container 10 applied to steps 24. Either container 10 or cover 12, or both, may be so treated. The glass cloth 22 or 18 (whose softening point should lie well above the normal ambient temperature of use, but preferably several hundred degrees below the temperature against which protection is expected to be required, to insure timely sealing of the cover to the container in an actual emergency) may be attached by casting of the wet formulation against it, or by any conventional adhesive. Container 10 is represented as having an outside facing 26, and cover 12 is represented as having a similar facing 28. For extremely high temperature resistance, this may well be cloth woven of silica fibers. It may be attached by casting the wet mixture of 14 and 16 against it, or may be attached with a convenient adhesive. If good mechanical handling properties are especially desirable, impregnation with epoxy cement will provide the durable face well known from its use in boat and similar fabrication. Similarly to improve durability, the inner walls of the container may be lined with glass cloth and/or epoxy/plastic. The drawing represents a reentrant cavity in container 10; if the entire container is cast in a mold, a collapsible central elastic mandrel will permit its withdrawal after the plaster of the formulation has set. If the cavity is not reentrant, the entire container may be cast upside down in a mold which has been lined with any desired outside facing material, and may be withdrawn when hardened.

In tests, containers of this general description have protected commercially available explosives in a deliberately fed gasoline fire for an hour before explosion occurred. Chromic oxide $Cr_2O_3$ was incorporated in the formulation to the extent of about 3 percent of the weight of plaster of paris used. This is intended to function as an opacifier to infrared radiation.

While the use of the formulations disclosed has been to a container, flat panels may be cast in accordance with the well known art for temporary or permanent installation as shields. An alternative to casting of a slurry is the following: A layer of the dry components suitably dispersed is placed in the conventional mold, and is then sprinkled with water, with no disturbance of the mixture other than that caused by the water itself. The plaster of paris becomes hydrated without stirring of the soluble hydrated salt (e.g. magnesium sulphate hydrate); the quantity of soluble salt dissolved in the water is minimized by this procedure. If desired, this procedure may be repeated to build up thick layers. Also, hollow vessels may be cast using the formulations taught to be placed over objects in or on the ground. Protection of supplies against brush or forest fires is a natural application.

This specification is descriptive of the inventions of three different inventors. Each invention is best described in conjunction with the others. It is here noted, and stipulated by the signer of this application that, to his best knowledge and belief, the invention of providing a water-insoluble coating upon soluble particulate salts to be incorporated undissolved in an aqueous slurry and thus in the solid formed therefrom is the invention of Louis R. McCreight; the invention of the novel materials formulations described herein and of their application to form high-temperature resistant containers and barriers is the invention of Michael J. Noone; and the invention of providing at the interface between the opening of a high-temperature resistant container and its lid or closure a relatively low-melting facing, described in the specification preferred embodiment as of glass cloth, is the invention of Howard W. Semon. The appended claims claim only that which the applicant in this application believes to be his own invention.

What is claimed is:

1. A composition of matter protective against temperature up to 1400°C. comprising:
   a. gypsum;
   b. discrete particulate inclusions therein of magnesium sulphate heptahydrate $M_gSO_4 \cdot 7H_2O$.

2. The composition claimed in claim 1 in which the proportion by weight of magnesium sulphate heptahydrate is not over 59 percent of the gypsum.

* * * * *